Jan. 31, 1956     C. W. ZIEGENBUSCH     2,732,949
TREATMENT OF THIXOTROPIC MATERIALS

Filed March 18, 1952     5 Sheets-Sheet 1

INVENTOR.
CARL W. ZIEGENBUSCH
BY
*Jasin V. Gleim*
ATTORNEY

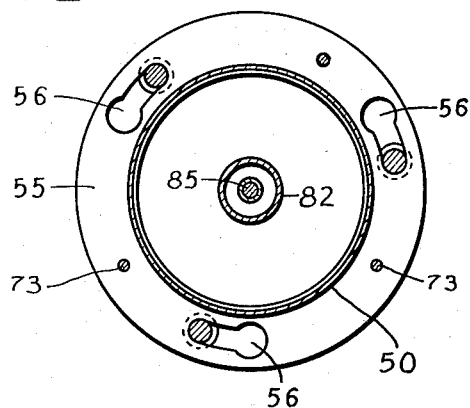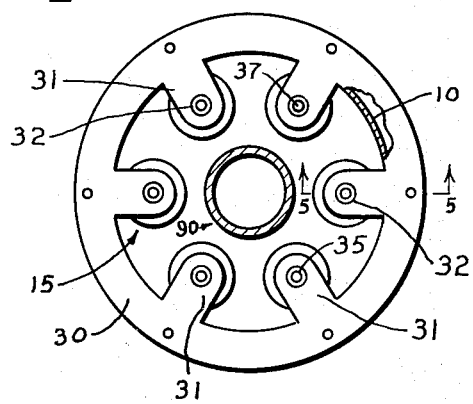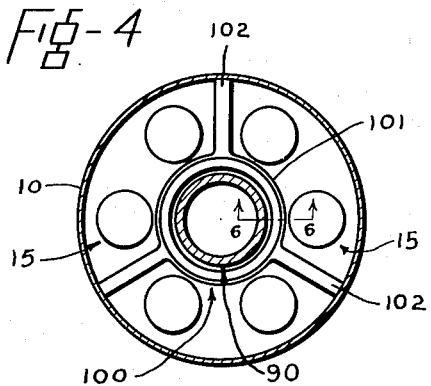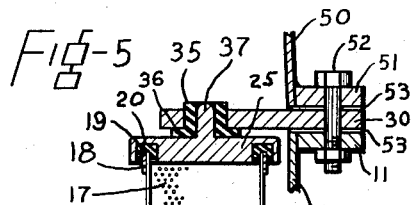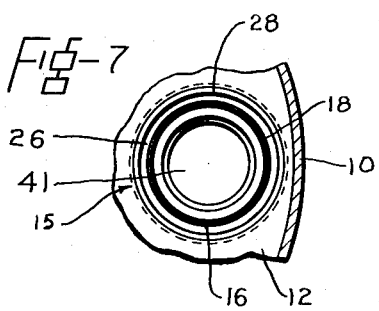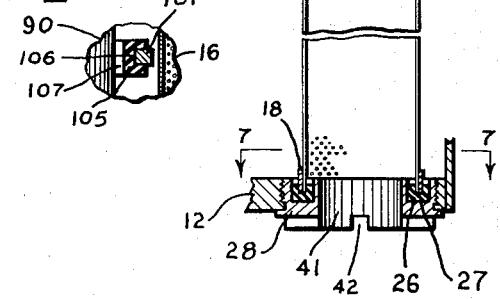
INVENTOR.
CARL W. ZIEGENBUSCH

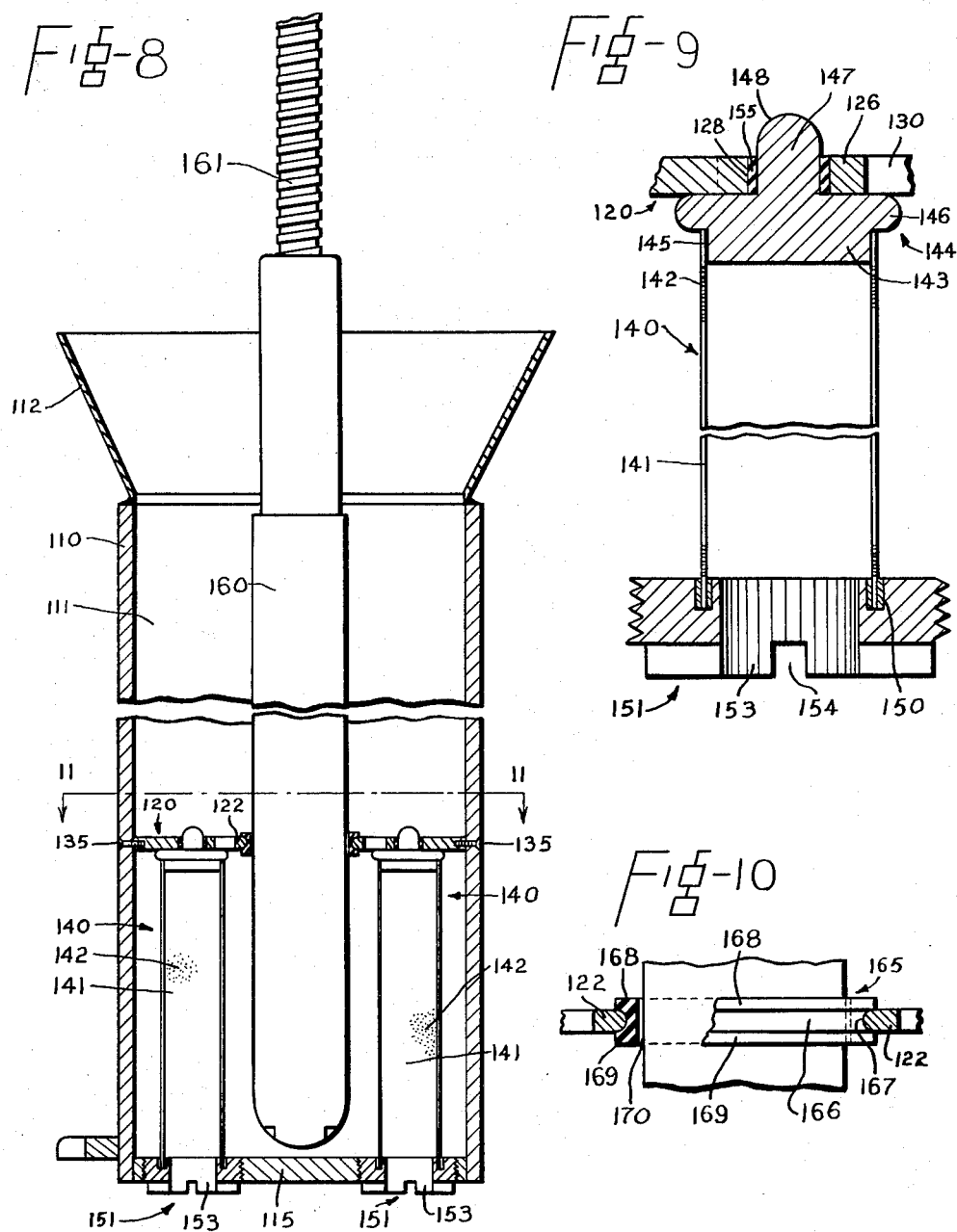

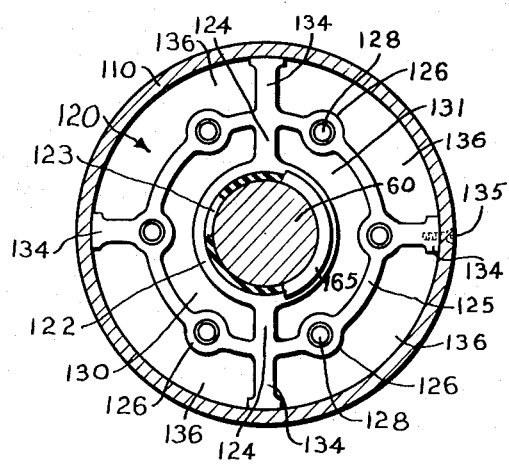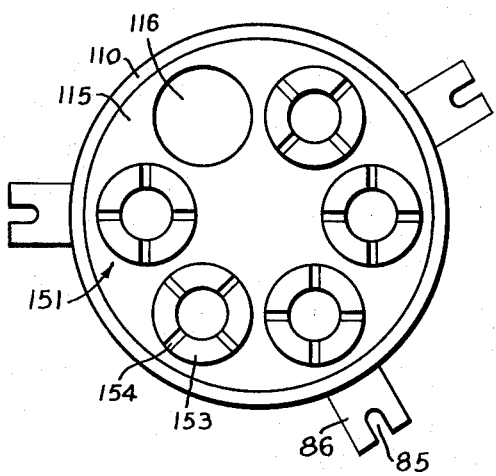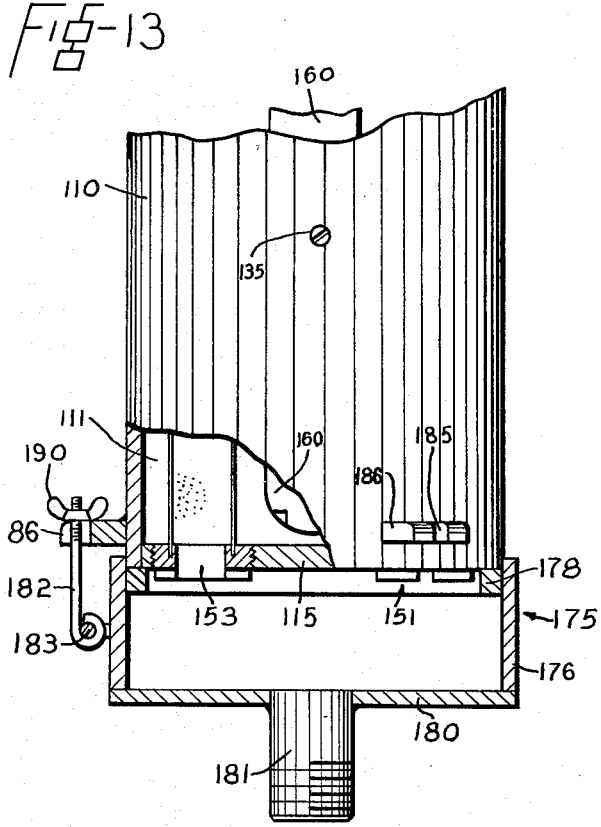

Jan. 31, 1956 C. W. ZIEGENBUSCH 2,732,949
TREATMENT OF THIXOTROPIC MATERIALS
Filed March 18, 1952 5 Sheets-Sheet 5
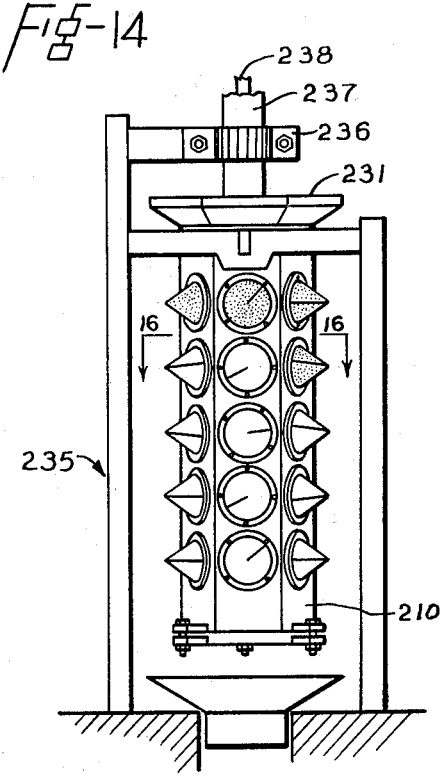
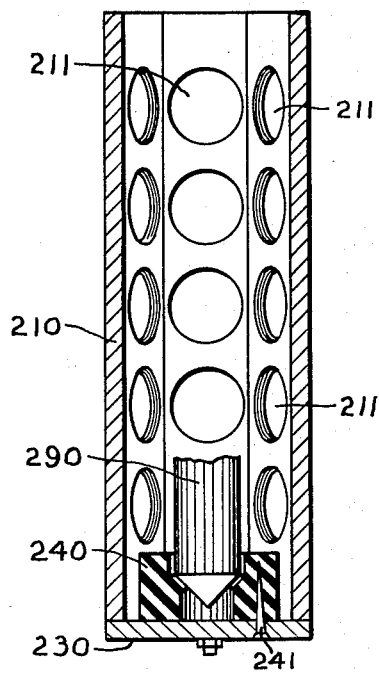
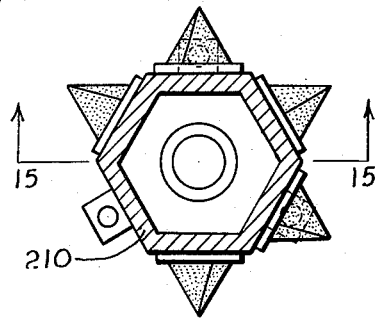
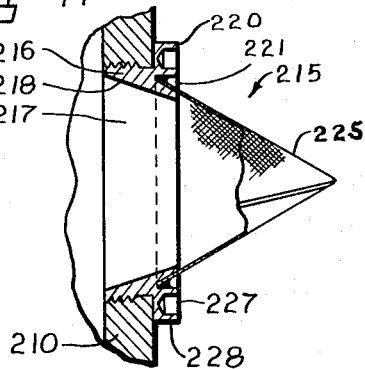
INVENTOR.
CARL W. ZIEGENBUSCH
BY
ATTORNEY

United States Patent Office 2,732,949
Patented Jan. 31, 1956

2,732,949
TREATMENT OF THIXOTROPIC MATERIALS

Carl W. Ziegenbusch, Chillicothe, Ohio, assignor to The Mead Corporation, Dayton, Ohio, a corporation of Ohio Application March 18, 1952, Serial No. 277,210

2 Claims. (Cl. 210—149)

This invention relates to the treatment of materials such as solutions, suspensions and the like of a thixotropic nature and is concerned particularly with apparatus for increasing the fluidity of such solutions and suspensions used in the paper coating, printing, painting and similar arts. It further relates to the use in such apparatus of a rotor element adapted for transforming rotary motion into relatively high frequency vibratory movements.

One of the principal objects of this invention is to provide economical and efficient methods for increasing the fluidity of highly viscous liquids such as thixotropic type suspensions and solutions, and concomitantly removing impurities and oversized particles therefrom.

Another object of this invention is to provide a method for effectively and economically increasing the fluidity of highly viscous liquids to flow through restricted openings of predetermined size and configuration, thereby removing impurities and oversized particles therefrom.

It is a further object of the invention to provide such a method by which paper coating compositions of the mineral type may be expediently treated for removal of impurities and oversized particles, such treated compositions being highly suitable for forming a coating upon paper to provide a printing surface that is receptive to high grade and exacting printing requirements.

It is also an object of the invention to provide simple portable apparatus suitable for the treatment of materials, and particularly for the treatment of highly viscous thixotropic solutions and suspensions, to change the characteristics of the materials, and particularly to impart fluidity characteristics to the materials and concomitantly remove impurities and oversized particles therefrom.

Another object of the invention is to provide an apparatus for the treatment of materials of the character referred to, wherein the material is subjected to highly efficient vibratory movements of relatively high frequency to secure the desired results.

A further object of the invention is to provide a novel apparatus of the character referred to wherein a rotor element is employed for transforming rotary motion into relatively high frequency movements, said rotor element being so disposed with respect to the material being treated as to effect the most efficient vibratory motion on the material.

Still another object is to provide apparatus for carrying out the methods referred to, which apparatus is automatically controlled and is of the character such that the parts may be readily assembled or disassembled.

Other objects and advantages will be apparent from the following description, accompanying drawings and the appended claims.

Reference is made to the drawings which illustrate preferred embodiments of the invention and in which like parts are designated by the same numerals.

Fig. 2 is a section on the line 2—2 of Fig. 1;

Fig. 3 is a sectional view taken on the line 3—3 of Fig. 1;

Fig. 4 is a sectional view taken on the line 4—4 of Fig. 1 with the screen element shown diagrammatically;

Fig. 5 is an enlarged detail section of a screening element of the device illustrated in Fig. 1, the section being taken on line 5—5 of Fig. 3;

Fig. 6 is a fragmentary sectional view taken on the line 6—6 of Fig. 4;

Fig. 7 is an enlarged fragmentary sectional view taken on the line 7—7 of Fig. 5;

Fig. 8 is a sectional view of a modified device constructed according to, and for carrying out the invention;

Fig. 9 is an enlarged view in section of one of the screen units of the device illustrated in Fig. 8;

Fig. 10 is a view partly in section and partly in elevation of a modified vibrator retainer, the vibrator and support therefor being shown fragmentarily;

Fig. 11 is a section taken on the line 11—11 of Fig. 8;

Fig. 12 is a showing of the device of the invention illustrated by Fig. 8 as viewed toward the bottom end thereof with one of the screen units removed;

Fig. 13 is a fragmentary view of the device of the invention illustrated by Fig. 8, with a backwash coupler, illustrated in section attached thereto;

Fig. 14 is an elevational view of a modified embodiment of the invention showing conical-shaped screening units;

Fig. 15 is a vertical sectional view of the modified device shown in Fig. 14, taken on line 15—15 of Fig. 16 with the screens removed;

Fig. 16 is a sectional view taken on line 16—16 of Fig. 14; and

Fig. 17 is an enlarged sectional view of a screen unit of the modified device shown in Fig. 14.

Figure 1:
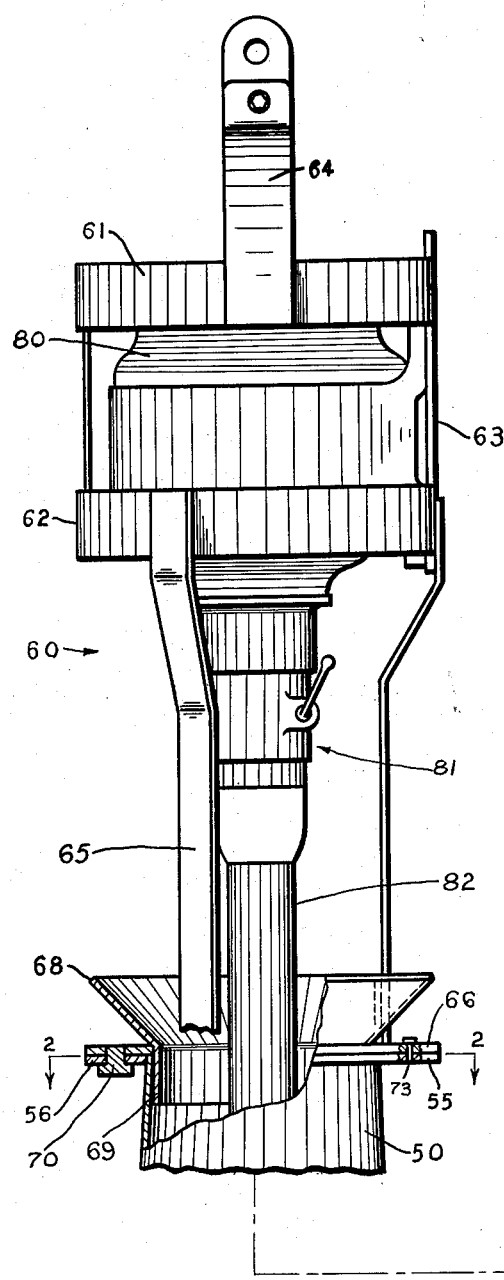
Fig. 1 is a view in elevation of a device constructed according to, and for carrying out, a preferred embodiment of the invention, certain parts being broken away to show internal construction.
Figure 1:
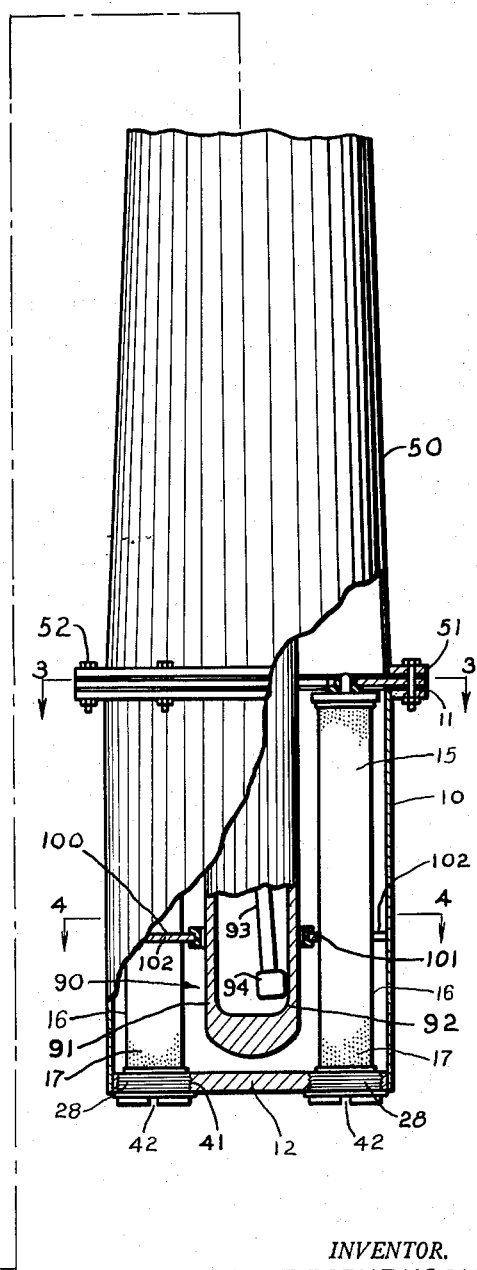

Referring to the drawings and particularly with respect to Figs. 1 to 7 inclusive, a preferred embodiment of the device of the invention which has proven unusually satisfactory during commercial operations for increasing the fluidity and concomitantly screening highly viscous heavy paste-like materials, such as high solids content aqueous thixotropic suspensions of clay, or the like, used in the paper coating art, is shown as having a cylindrical metal casing, designated generally by the numeral 10. The upper end of casing 10 is provided with a projecting rim or flange portion 11 rigidly secured thereto as by welding while the other or lowermost end portion of the casing 10 has a closure plate 12. Positioned within the casing 10 are screening or refining units 15 shown generally in Fig. 1 and more in detail in Fig. 5. As shown, the screening units 15 are constructed of a length of screen material 16 having a multitude of fine holes or slots 17, which holes are preferably of a diameter of $9/1000$ of an inch or in the case of slots, the slots are preferably of the order of $9/1000$ of an inch in width. The opposite ends of screen 16 are provided with reinforcing bands 18 preferably welded in place to provide sufficient rigidity and strength. The upper end of the screen 16 carries an annular grooved resilient band 19 adapted to fit within an annular recessed portion 20 provided in a supporting member 25. The lowermost portion of the screen 16 is likewise provided with an annular resilient band or mounting member 26 which is received in the annular groove 27 of a screw plug 28. Screen units 15 as described are supported within the casing 10 by means of a spider member 30 adapted to fit upon the flange portion 11 and preferably has a plurality of inwardly projecting members 31. Projecting members 31 are provided with bores 32 adapted to receive a resilient member 35 having a flange portion 36 that is carried by boss portion 37 which is an integral part of the support member 25. Screw plug member 28 is provided with a bore 41 and the lower outer surface of the member 28 has a plurality of slots 42 to facilitate locking or removing the screen units 16 by a suitable tool.

Detachably secured to the upper end of cylindrical casing 10, preferably by means of bolts 52 is a casing 50 having projecting rim or flange portions 51 and 55 on the respective ends thereof. As shown, spider member 30 is supported between flanges 11 and 51 provided with gaskets 53 and flange 55 is provided with a plurality of keyhole slots 56 referred to hereinafter.

Motor mounting support structure indicated generally by the numeral 60 includes a pair of annular band members 61 and 62 attached to a motor mounting plate 63. The upper support band 61 is provided with a hanger member 64 adapted to support the unit of the invention in operative position. Band 62 carries strap members 65 preferably rigidly secured to a rim or flange member 66. As shown in Fig. 1, flange member 66 is designed to securely accommodate a funnel shaped member 68 having a narrowed neck portion 69 adapted to extend into casing 50. Flange member 66 of the motor mounting support structure 60 is releasably secured to casing 50 by means of headed studs 70 received in the enlarged portion of keyhole slots 56 and locked thereto by a twisting movement. To assure maintained locking engagement, lock pins 73 are provided in aligned holes in flanges 55 and 66. Mounting plate 63 carries a suitable motor unit 80 having a removable pendant extension 81 locked thereto. Extension 81 carries a hollow tube member 82 which has enclosed therein a flexible drive cable 85 adapted to furnish automotive power for the high frequency vibrator unit indicated generally by numeral 90 which is suspended and extends into the lowermost portion of casing 10.

In accordance with the invention, any suitable type of vibrator unit may be used that will transform rotary motion into vibratory movements having a frequency equal to or higher than that of the rotary motion. Vibrator unit 90 preferably consists of a vibrator tube or casing 91 provided with a circular inner wall or surface 92. Suitably rotatably secured to drive cable 85, adjacent one end of casing 91 is a shaft 93 provided with a member or weight 94 which in form is correspondingly circular to wall 92. During operation, as when the motor unit 80 is rotating drive cable 85, shaft 93 revolves about its axis causing the weight 94 to assume a rotary movement and sequentially come into a continuous striking contact with inner wall 92, thereby transmitting impulses onto the vibrator casing 91, so that casing 91 will vibrate with a frequency that is equal to or higher than the frequency of rotary shaft 93.

Figs. 1 and 4 show an auxiliary spider member 100, which, if desired may be provided to guard the screening units 15 against damage that may be caused by excessive vibratory movement of the vibrator unit 90. As illustrated, member 100 has a centrally disposed ring element 101 carrying radially projecting arms 102 preferably welded or otherwise secured within metal casing 10. Radially projecting arms 102 are positioned in a manner to accommodate screen units 15. Ring 101 carries a grooved resilient bumper member 105, the groove portion 106 fitting within the ring 101 and so arranged as to provide restricting area 107 between bumper member 105 and the vibrator unit 90 as shown in Fig. 6.

Referring to Figs. 8 to 13 inclusive, another embodiment of this invention is shown as having a cylindrical casing 110 defining a tank or chamber 111. The upper or open end of casing 110 has secured thereon a cylindrical funnel shaped extension 112 to aid pouring of the highly viscous materials to be treated into the tank 111. The lower or bottom end of the casing 110 is preferably closed by a disk member 115 having a plurality of threaded apertures 116 radially spaced as shown in Fig. 12.

A support or web structure (Figs. 8 and 11) is provided as shown generally at 120 as a casting with a centrally disposed ring member 122 having a bore 123, ring member 122 being connected by web portions 124 to a second ring 125. Ring 125 has radially spaced enlarged portions 126 each having a bore or aperture 128 provided therein. Ring 125, spaced outwardly of ring 122, and the interconnecting web portions 124 define open spaces 130 and 131. Outwardly extending legs 134, four in number, are adapted to provide fastening means to attach and support member 120 to and within tank 111 in spaced relation to the bottom plate 115 by screws 135. The provision of legs 134 serves also to leave open spaces 136 which, combined with open spaces 130 and 131 provide ample open areas to allow minimum unrestricted downward feeding flow of a highly viscous material being treated, such as a paper coating composition of the mineral type as used for forming a mineral coated surface upon paper which is receptive to high quality printing, to the lower regions of the tank 111.

The screening or refining units 140 of this embodiment of the device of the invention, are shown in Fig. 8 and more particularly in Fig. 9. The units 140 are constructed of a metal tubular member 141 and preferably of stainless steel material which has been perforated to form a plurality of fine holes simulating a screen or slots 142, which holes are preferably of a diameter of $9/1000$ of an inch or in the case of slots, the slots are preferably $9/1000$ of an inch in width. The upper and open end of the tubular member 141 is adapted to fit the reduced part 143 of the screen supporting plug 144, to which it is secured as by welding or soldering as shown at 145. The screen supporting plug 144 has a flange portion 146 and an upwardly extending boss 147 having a rounded end portion 148. The lower end of tubular member 141 fits within an annular groove 150 provided in the top surface of a threaded screen locking support member 151, groove 150 being filled with solder or accommodating an annular rubber ring to secure the tubular screen member 141 to the screen locking support member 151. As previously described with reference to plug member 28 of screen unit 15, support member 151 is also provided with a bore 153 and the lower surface of the locking member has a plurality of slots 154 for locking or removing the screen units 140.

To assemble the units 140 within the tank 111, the upwardly extending boss 147 of the screen supporting plug 144 is first fitted with a rubber bushing 155 and the unit 140 is then inserted through the apertures 116 in the disk member 115. The boss 147 is also inserted in one of the bores 128, in support or web 120, directly above the aperture 116 through which the unit is inserted. The unit 140 is then securely locked in place by screwing the lower threaded member 151 in threaded aperture 116 until the flange portion 146 of plug 144 is in substantial abutment with web 120.

The motive force employed to treat highly viscous materials such as thixotropic type suspensions and solutions in accordance with this invention to increase their fluidity and concomitantly remove impurities and oversized particles therefrom as by gravity screening, is provided by the use of a high frequency constant or variable speed vibrator unit 160. The vibrator unit 160 of this embodiment is driven by means of flexible cable 161 and powered by either an electric or air powered motor (not shown). The vibrator unit 160 is preferably of the structure previously described and is substantially vertically retained within the tank 111 by the web support 120 by means of a resilient rubber ring 165 shown in detail in Fig. 10. Ring 165 has a rounded groove 166 formed to fit snugly over the rounded inner edge 167 of the inner ring 122 of the support web with lip portions 168 and 169 overhanging the upper and lower surfaces of the ring. In this manner, the resilient rubber ring is held firmly and into engagement with the web support 120 to provide a yielding retention for the pendant vibrator unit 160 that projects into the opening 170 of the ring adjacent the bottom of the tank 111.

With the vibrator unit 160 pendantly mounted as shown in Fig. 8, the material to be treated, as for example, a highly viscous heavy paste-like material such as a high solids content aqueous and thixotropic suspension of clay used in the paper coating art, is suitably pumped into the tank 111 where it will gravitate downwardly through the openings in the web structure 120 and fill in around the screening or refining units 140. The high frequency vibrator unit is then set into motion by its motor and provides vibratory movements as previously described but yielding restricted to a vibrating zone by the resilient ring 165 and the supporting ring member 122 of the web structure 120. In this manner, the vibrator will vibrate in all directions radially of its axis but will be restricted from contact with the screen units 140. The vibratory movements of the vibrator unit 160 appear either to be transmitted to the material being treated causing violent shear stresses to occur at high frequency rates in the material itself, thereby greatly increasing the fluidity or rate of movement of the treated material and permitting gravity screening through restricted openings, or to be transmitted in a series of rapidly pulsating movements of sufficient magnitude to force the treated material through such openings or slots 142 of the screening or refining units 140. In any event, the material of the type referred to, after being so treated, flows downwardly through the bores 153 of the support and locking member 151 and into a convenient receptacle for subsequent intended use.

The cleaning of the described devices of the invention as well as the modified device hereinafter described is effectively accomplished by means of a back-wash coupler 175 shown attached to cylindrical casing 110 in Fig. 13. Coupler 175 is in the form of a cap 176 having a flange or ring member 178 preferably welded inside and adjacent the upper and open end of the cap 176 as shown. The closed end 180 of the cap has a centrally located threaded nipple 181 suitably secured thereto as by welding and communicates with the interior of the cap 176. Coupler 175 has a plurality of swing bolts 182, three being suitable, pivotally mounted by means of brackets 183 welded to the outer surface thereof.

In operation, the open end of the coupler 175 is fitted over the bottom of the cylindrical casing 10 or 110 with the flange 178 in abutment with the bottom thereof, and a portion of the cap 176 surrounding casing 10 or 110. The coupler 175, is then fastened to the casing by swing bolts 182 engaged within slots 185 of lugs 186 welded to the casing 10 or 110, and locked by wing nuts 190. With the coupler in place, a hose may be connected to the nipple 181 and a water supply provided to flow through the bores 151 to promote a surging flow through the screen units 15 and 140. In this manner the screen units and the interior of the devices of the invention may be quickly and simply cleaned without removing and replacing any parts thereof. However, if the need arises the screen units may be removed in a simple manner for further cleaning or replacement.

A still further modified showing of the device of this invention is illustrated in Figs. 14 to 17 inclusive. Referring to Fig. 14, the device is illustrated as having a hexagonal casing 210 provided with a plurality of threaded apertures 211 on the respective side portions. Fig. 17 shows a detailed construction of a screen unit indicated generally by the numeral 215. A threaded mounting member 216 is provided with a bore 217, the side walls of which are angularly disposed as shown at 218. The face 220 of the mounting member 216 is provided with a groove 221 adapted to receive a conically shaped screen 225 which is received within the groove 221 and suitably welded or brazed thereto. A plurality of bores 227 are provided in the flange portion 228 to facilitate assembly of the screen unit 215 into the threaded apertures 211.

The lower portion of casing 210 is provided with a closure plate 230 attached thereto and the upper end of casing 210 carries a funnel-shaped member 231. The vibrator unit as illustrated is supported by frame structure 235 which carries a bracket member 236 adapted to support hollow tube member 237 which preferably corresponds to member 82, and contains a flexible drive cable 238 corresponding to cable 85 (see Fig. 2). A high frequency vibrator unit 290 is positioned within the casing 210 in the same manner as described in the preferred form of the invention shown in Fig. 1. In this modification, the lowermost portion of the vibrator unit 290 extends into a resilient mounting member 240 which is attached to the closure plate 230 in any suitable manner as by screws 241.

As indicated above, the apparatus of this invention has important uses in various fields, and it is particularly valuable in the treatment of paper coating compositions of high thixotropic character, such compositions being described in the patent to O'Connor, Savage and Schwalbe, No. 2,565,260, dated August 21, 1951.

In the treatment of various types of materials such as solutions and suspensions of a thixotropic nature in accordance with this invention, wherein the viscosity, undesirable impurities, or large aggregate particle size etc. of the respective materials may vary, it has been found that the number of screening units employed may be diminished or increased accordingly, provided the vibrator member is operated to develop a frequency sufficient to increase the fluidity and consequent rate of movement of such material as to convey the material gravitationally or by other inherent forces through normal or restricted openings; such conveyance and refinement heretofore being impossible or impractical. During commercial operations at normal room temperature and with high solids content color suspension of the type referred to in the aforementioned patent to O'Connor et al., using the particular apparatus described and disclosed in Figs. 1 to 7 incl., especially satisfactory screening and refining results have been obtained with only two screened units 15 which were provided with a multitude of fine holes of a diameter of $9/1000$ of an inch while the vibrating frequency of the vibrator unit 90 was maintained sufficiently high, as for example, of the order of 15,000 to 30,000 R. P. M. to increase the fluidity of the material to a flowable state, affording concomitant screening.

While the apparatus and process herein described constitute preferred embodiments of the invention, it is to be understood that the invention is not limited to these precise forms of apparatus and process, and that changes may be made therein without departing from the scope of the invention which is defined in the appended claims.

What is claimed is:

1. Apparatus of the character described providing increased flow characteristics sufficient to effect screening of highly viscous thixotropic materials comprising a cylindrical casing having inlet means at the upper end thereof, a wall at the lower end thereof, said wall having a plurality of radially spaced openings therein, a disk member having a plurality of radially spaced apertures therein, said disk member being transversely mounted in said casing in vertically spaced relation to said wall, a plurality of cylindrical screen units mounted within the apertures of said disk member and each fitted to one of said openings, said wall having a centrally disposed opening, a resilient ring mounted in said centrally disposed opening, a tubular vibrator element removably mounted within said ring and extending downwardly to a point adjacent to said wall, a rotatable shaft extending downwardly into said vibrator element and having a circular weighted member at the free end thereof, means for rotating said shaft to cause said weighted member to assume a rotary movement and sequentially come into continuous striking contact with the inner wall of said vibrator elements to provide said vibrator element with sufficient vibratory movements to increase the fluidity of said material in said casing, whereby said material gravitates through said screening units.

2. Apparatus of the character described providing increased flow characteristics sufficient to effect screening of highly viscous thixotropic materials comprising a cylindrical casing having inlet means at the upper end thereof, a wall at the lower end thereof, said wall having a plurality of radially spaced openings therein, a disk member having a plurality of radially spaced apertures therein, said disk member being transversely mounted in said casing in vertically spaced relation to said wall, a plurality of cylindrical screen units mounted within the apertures of said disk member and each fitted to one of said openings, said wall having a centrally disposed opening, a resilient ring mounted in said centrally disposed opening, a tubular vibrator element removably mounted within said ring and extending downwardly to a point adjacent to said wall, a rotatable shaft extending downwardly into said vibrator element and having a circular weighted member at the free end thereof, means for rotating said shaft to cause said weighted member to assume a rotary movement and sequentially come into continuous striking contact with the inner wall of said vibrator elements to provide said vibrator element with sufficient vibratory movements to sequentially impinge such movements upon the material between said vibrator element and successive screening units and to increase the fluidity of said material in said casing, whereby said material gravitates through said screening units.

References Cited in the file of this patent

UNITED STATES PATENTS

| | | |
|---|---|---|
| 654,592 | Barr | July 31, 1900 |
| 1,662,180 | Ball | Mar. 13, 1928 |
| 1,989,409 | Gordon | Jan. 29, 1935 |
| 2,068,099 | Engle | Jan. 19, 1937 |
| 2,070,201 | Geary | Feb. 9, 1937 |
| 2,108,087 | Thayer | Feb. 15, 1938 |
| 2,194,410 | Svenson | Mar. 19, 1940 |
| 2,422,639 | Wenander | June 17, 1947 |
| 2,459,660 | Lange | Jan. 18, 1949 |